(12) United States Patent
Chen et al.

(10) Patent No.: US 10,340,687 B2
(45) Date of Patent: Jul. 2, 2019

(54) ESD PROTECTION CIRCUIT AND METHOD WITH HIGH IMMUNITY TO HOT PLUG INSERTION AND OTHER TRANSIENT EVENTS

(71) Applicant: Texas Instruments Incorporated, Dallas, TX (US)

(72) Inventors: Zhong Chen, Fayetteville, AR (US); Liang Wang, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 346 days.

(21) Appl. No.: 15/062,350

(22) Filed: Mar. 7, 2016

(65) Prior Publication Data

US 2017/0256933 A1    Sep. 7, 2017

(51) Int. Cl.
*H02H 3/20* (2006.01)
*H02H 9/04* (2006.01)
*H02H 3/22* (2006.01)
*H02H 9/00* (2006.01)

(52) U.S. Cl.
CPC .............. *H02H 9/046* (2013.01); *H02H 3/22* (2013.01); *H02H 9/004* (2013.01)

(58) Field of Classification Search
CPC ............ H02H 3/20; H02H 3/22; H02H 9/004; H02H 9/046
USPC .......................................................... 361/56
See application file for complete search history.

(56) References Cited

U.S. PATENT DOCUMENTS

| | | |
|---|---|---|
| 5,239,440 A | 8/1993 | Merrill |
| 5,907,464 A | 5/1999 | Maloney et al. |
| 5,946,177 A | 8/1999 | Miller et al. |
| 6,455,902 B1 | 9/2002 | Voldman |
| 6,919,602 B2 | 7/2005 | Lin et al. |
| 6,926,957 B2 | 8/2005 | Bakulin et al. |
| 7,027,275 B2 | 4/2006 | Smith |
| 7,209,332 B2 | 4/2007 | Stockinger et al. |
| 7,230,806 B2 | 6/2007 | Poon et al. |
| 7,336,460 B2 | 2/2008 | Dournelle et al. |
| 7,724,485 B2 | 5/2010 | Worley et al. |
| 7,990,666 B2 | 8/2011 | Riviere et al. |
| 8,760,829 B2 | 6/2014 | Wang et al. |

(Continued)

OTHER PUBLICATIONS

Venkatasubramanian, et al., "Rail Clamp with Dynamic Time Constant Adjustment", ESD/EOS Symposium 2014, 7 pgs.

*Primary Examiner* — Zeev V Kitov
(74) *Attorney, Agent, or Firm* — Rose Alyssa Keagy; Charles A. Brill; Frank D. Cimino

(57) ABSTRACT

Disclosed examples include an ESD protection circuit to protect an IC pad with high immunity against hot-plug surges, switching noise or other transient voltage conditions on the protected pad. The ESD protection circuit includes a clamp transistor and a trigger circuit responsive to rises in the protected pad voltage at or above a first slew rate to turn on the clamp transistor, as well as a second circuit coupled between the control terminal of the clamp transistor and a voltage supply node. The second circuit responds to rises in a voltage of the clamp transistor control terminal at a second, lower slew rate to reduce the voltage of the first control node to at least partially turn the clamp transistor off to reduce leakage current flow through the clamp transistor during transient voltage conditions on the protected pad.

18 Claims, 3 Drawing Sheets

(56) References Cited

U.S. PATENT DOCUMENTS

2002/0171544 A1\* 11/2002 Schmurr ................ G08B 25/04
340/538
2014/0036398 A1 2/2014 Kuznetsov \* cited by examiner

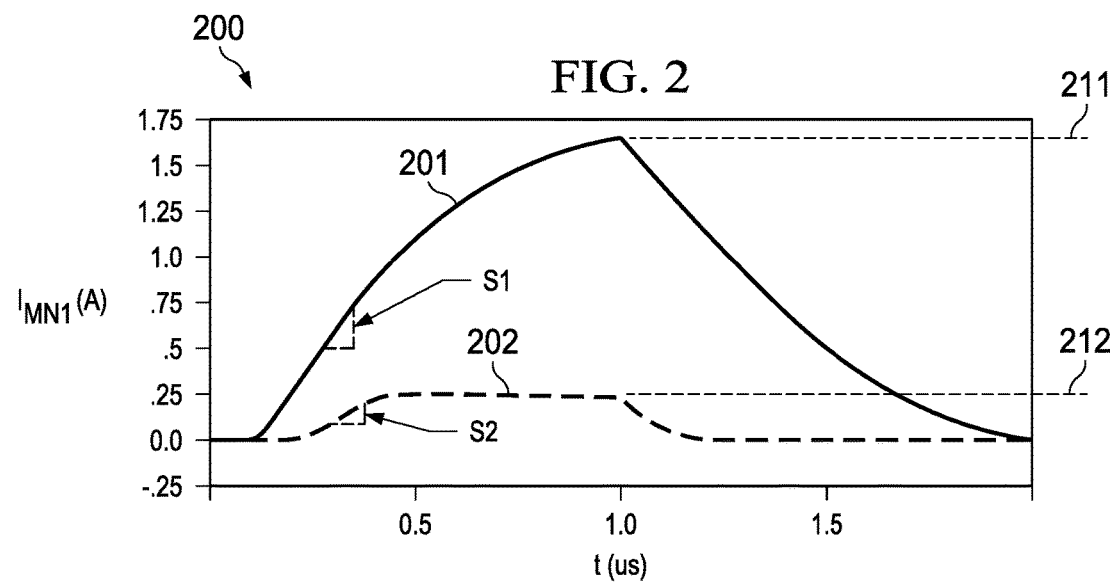
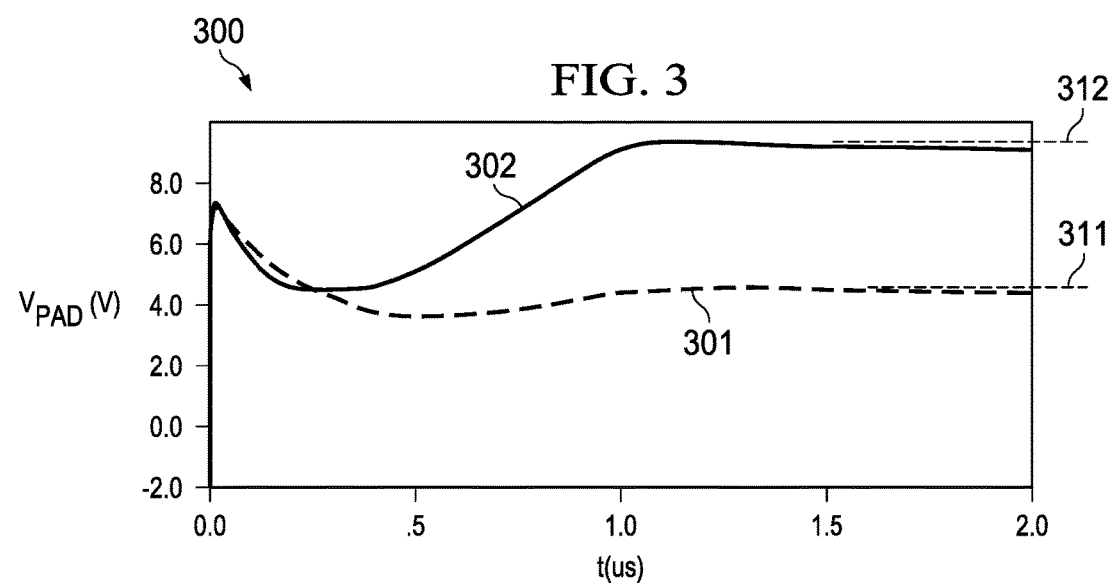

ESD PROTECTION CIRCUIT AND METHOD WITH HIGH IMMUNITY TO HOT PLUG INSERTION AND OTHER TRANSIENT EVENTS

TECHNICAL FIELD

The present disclosure relates generally to electrostatic discharge (ESD) protection and more particularly to ESD protection circuits with high immunity to transient events.

BACKGROUND

ESD events can be triggered by human interaction with an integrated circuit (IC), causing high voltages on one or more pads of the IC. If the IC is unprotected, these high voltages can lead to undesired current flow through internal circuitry, which can damage or degrade circuit components of the IC. Accordingly, many ICs include protection circuits to provide discharge paths between one or more pads and a ground terminal. ESD protection circuits may be provided to protect power supply terminals, as well as to protect I/O terminals and other external connections that may be subjected to ESD events. In use, however, certain ICs need to be inserted into a socket of a printed circuit board while the board is powered, or the IC is mounted to a circuit board that itself is plugged into or interconnected with a powered host circuit. These situations are sometimes referred to as hot-plug or hot-socket insertion situations. During hot-plug conditions, ESD protection circuit may be inadvertently triggered, resulting in high current flow between a protected pad and a ground connection, which can damage or degrade the ESD protection circuit or other components of the IC. The ESD protection circuit may be actuated by triggering circuits with small time constants, but false triggering of the ESD circuit may still occur in certain hot-plug transient events involving high pad voltages or where an ESD protection transistor is sensitive to transient slew rates due to large gate-drain or gate-source capacitances associated with the ESD protection transistor. In such cases, the triggering circuit can lose control of the protection switch. Further circuitry can be added to limit leakage current during hot-plug or other transient events, but this approach adds to the cost and size of the IC and/or a host printed circuit board. Also, such current limiting techniques often require high voltage components to accommodate hot-plug conditions or other transient events in which relatively high voltages are seen at a protected IC pad.

SUMMARY

Disclosed examples include integrated circuits and protection circuitry to protect an IC pad against ESD events with high immunity against leakage currents. The protection circuit includes a clamp transistor and a trigger circuit responsive to rises in the protected pad voltage at or above a slew rate to turn on the clamp transistor, as well as a second circuit coupled between the control terminal of the clamp transistor and a voltage supply node. The second circuit responds to rises in a voltage of the clamp transistor control terminal at a second, lower slew rate to reduce the voltage of the first control node to at least partially turn the clamp transistor off to reduce leakage current flow through the clamp transistor during hot-plug surges, switching noise or other transient voltage conditions on the protected pad.

BRIEF DESCRIPTION OF THE DRAWINGS

FIG. 2 is a signal diagram illustrating hot-plug event ESD circuit leakage current flow.

FIG. 3 is a signal diagram illustrating active pad clamp voltage during ESD events.

DETAILED DESCRIPTION

Figure 1:
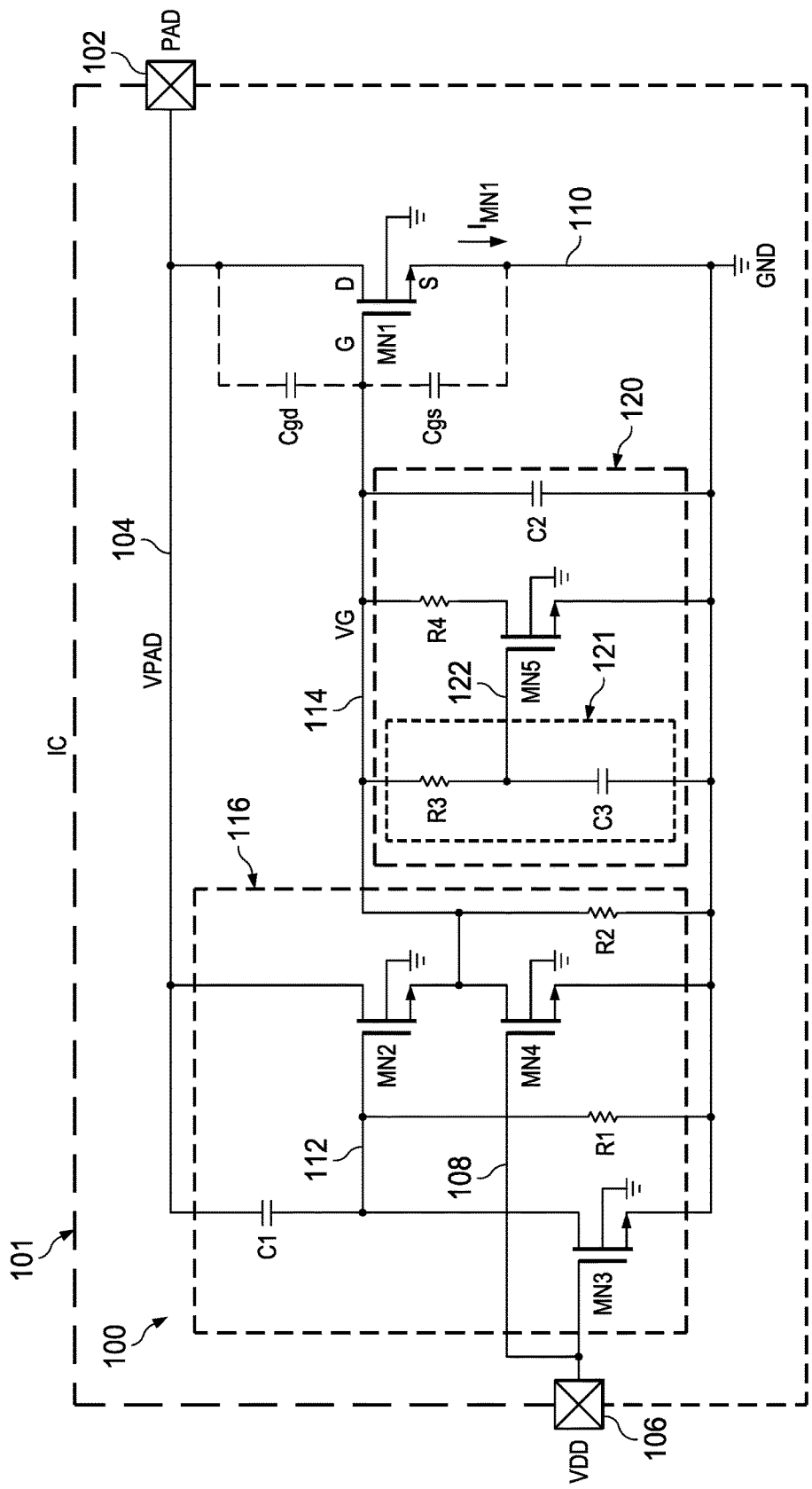
FIG. 1 is a schematic diagram of an ESD protection circuit.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical connection or combinations thereof. For example, if a first device couples to or is coupled with a second device, that connection may be through a direct electrical connection, or through an indirect electrical connection via one or more intervening devices and connections.

FIG. 1 shows an ESD protection structure in an integrated circuit IC 101 including an externally accessible electrically conductive pad structure 102, such as an IC pin or terminal which can be soldered to a host printed circuit board (PCB) or otherwise coupled to electrically connect an internal circuit (not shown) connected between the line 104 and ground of the IC 101 with an external circuit (not shown). The IC 101 also includes an ESD protection circuit 100 to protect the internal circuit 104 against ESD events. The example ESD protection circuit 100 protects the IC pad 102 with high immunity against hot-plug surges, switching noise or other transient voltage conditions on the protected pad 102. The IC 101 can include one or more protection circuits 100 for protection of any number and type of pad 102. In one example, the protected pad 102 is a power supply pad to provide power from an external circuit to the internal circuit node 104, and the circuit 100 is connected between the internal circuit node 104 and a ground or other first voltage supply node or reference voltage node 110 (e.g., GND). In practice, the ESD protection circuit 100 can be connected between any terminals of an integrated circuit to protect a pad 102 against ESD events.

The ESD protection circuit 100 includes an N-channel FET clamp transistor MN1, referred to herein as a first transistor, and a trigger circuit 116 that turns MN1 on in response to rises in the protected pad voltage VPAD at or above a first slew rate. The protection circuit 100 also includes a second circuit 120 to mitigate leakage current in the clamp transistor MN1 during transient voltage conditions on the protected pad 102. The first transistor MN1 includes a first drain terminal D coupled with the pad 102, a first source terminal S coupled with GND, and a first gate control terminal G coupled to a first control node 114. As schematically shown in FIG. 1, the first transistor MN1 includes a gate-drain capacitance Cgd and a gate-source capacitance Cgs. In operation, voltage surges on the circuit node 104 connected to the protected pad 102 can cause capacitive coupling at the first control node 114 by way of the gate-drain capacitance Cgd. This coupling increases the gate voltage VG of the first transistor MN1. In a particular implementation where the first transistor MN1 includes a LDMOS and/or a drain extended DEMOS transistors, the capacitance ratios Cgd/Cgs can be relatively large, which may be about 4 or more. Also, where the nominal voltage at the protected pad 102 is relatively high, the gate control terminal or node 114 is easier to pull up during transient events.

The second circuit 120 reduces the magnitude of the transient leakage current $I_{MN1}$ conducted by the first transistor MN1 during hot-plug insertion, switching noise or other transient events experienced by the IC 101, while allowing the trigger circuit 116 to operate the clamp transistor MN1 to shunt ESD event current from the protected pad 102 to the voltage supply node (or ground node GND) 110. Controlling the leakage current during hot-plug and other transient conditions mitigates or avoids the need for board-level components to limit transient leakage current. The second circuit 120 is coupled between the control terminal 114 of the clamp transistor MN1 and the node GND and operates according to the voltage slew rate or dV/dt at the gate control terminal 114 of MN1. Since the second circuit 120 is not connected to the node 104 or the protected pad 102, the circuit components of the second circuit 120 do not need to be high voltage components. Accordingly, the second circuit 120 provides leakage current reduction functions without significant size or cost impact on the IC 101.

The trigger circuit 116 includes first and second N-channel FET trigger circuit transistors MN2 and MN4 coupled in series with one another between the protected pad 102 and GND. MN2 and MN4 are joined at the control terminal 114 of the clamp transistor MN1, and a resistor R2 is connected from the control terminal node 114 to GND. The gate of MN2 is connected to an internal node 112, and a third N-channel FET trigger circuit transistor MN3 is connected between the node 112 and the node GND. The gates of MN3 and MN4 are connected via line 108 to a supply voltage pad 106 (VDD) connected to a second supply voltage node in the illustrated example. In steady state operation with no transient events or ESD events, transistors MN3 and MN4 are turned on by a high VDD signal at the line 108, and MN4 pulls down the gate control node 114 of MN1. In this state, moreover, MN2 is turned off. As a result, no leakage current flows through MN1. The trigger circuit 116 includes a first capacitor C1 and a first resistor R1 between the protected pad 102 and GND to control the trigger circuit sensitivity in order to respond to ESD events. In particular, the trigger circuit 116 responds to a first voltage rise in the pad voltage VPAD at or above a first slew rate set by R1 and C1 to turn the first transistor MN1 on to conduct a current $I_{MN1}$ from the pad 102 to GND.

In steady state operation, with a supply voltage provided to the VDD pin 106, MN3 is turned on, and the node 112 is at GND potential. As a result, the capacitor C1 in steady state is charged to VPAD, and the current through R1 is zero. If an ESD event occurs at the pad 102, the voltage VPAD rises quickly, for example, with a rise time of approximately 10 ns or less in a 2000 V human body model (HBM) ESD test event. The first voltage rise in the VPAD voltage at the node 104 raises the voltage of the node 112, causing MN2 to turn on to raise the gate voltage VG at the first control node 114. This turns on MN1 which conducts the current $I_{MN1}$ from the pad 102 to the voltage supply node 110. In this manner, the slew rate sensitivity of the trigger circuit 116 is set by C1 and R1, and the circuit 116 responds to rising VPAD voltage at or above the first slew rate. A trigger circuit time constant τ2 associated with the first capacitor C1 and the first resistor R1 corresponds to the first slew rate. In one example, the trigger circuit time constant τ2 associated with R1 and C1 is 100 ns or less. In one example, the trigger circuit time constant τ2 is 50 ns or less.

The second circuit 120 responds to slower voltage transients, but selectively refrains from turning off MN1 for fast transient events such as detected ESD occurrences. In this manner, the protection circuit 100 advantageously provides a conduction path through MN1 to quickly discharge ESD current, while mitigating leakage current for slower transient events, such as hot-plug situations in which VDD is essentially floating temporarily, or switching noise situations or other such transient conditions. In particular, the second circuit 120 responds to rises in the gate control voltage VG at a second, lower slew rate to reduce the voltage VG of the first control node 114 to at least partially turn off the clamp transistor MN1. This operation reduces leakage current flow $I_{MN1}$ through the clamp transistor MN1 during transient voltage conditions on the protected pad 102.

In the example of FIG. 1, the second circuit 120 includes a low pass filter circuit 121 formed by a first filter resistor R3 and a first filter capacitor C3. Other forms of low pass filter can be used in different examples. The filter circuit 121 provides a rising filter output signal at a first filter node 122 in response to rises in the voltage VG of the first control node 114. R3 is connected between the control node 114 and the first filter node 122, and C3 is connected between the node 122 and GND. As previously mentioned, a transient rise in the protected pad voltage VPAD couples to the gate control terminal 114 of MN1 through the gate-drain capacitance Cgd, and the second circuit 120 senses the voltage change on the node 114. As the voltage VG of the node 114 rises at a sufficiently low second slew rate (e.g., below the first slew rate associated with the trigger circuit 116), the filter output signal voltage at the node joining R3 and C3 rises. A filter time constant τ1 associated with the first filter resistor R3 and the first filter capacitor C3 of the low pass filter circuit 121 corresponds to the second slew rate response sensitivity of the second circuit 120, where τ1>τ2. In one example, the filter time constant τ1 associated with R3 and C3 is 1 µs or more.

The second circuit 120 also includes a second transistor MN5, which has a second drain terminal coupled with the node 114, a second source terminal coupled with GND, and a second gate control terminal coupled with the first filter node 122. The rising filter output signal from the low pass filter 121 turns MN5 on in response to a second voltage rise in the voltage VG at the control node 114 at the second slew rate. The second circuit 120 in one example also includes an RC circuit formed by a second resistor R4 connected between the control node 114 and the drain of MN5, and a second capacitor C2 coupled between the control node 114 and GND. R4 and C2 control the pull down strength of the second circuit 120, and the pull down strength reflects the capacity of the second circuit 120 to reduce the voltage VG in response to hot-plug situations, switching noise and other voltage transient conditions. The second circuit 120 allows operation of the trigger circuit 116 to protect the pad 102 and associated circuitry from ESD stresses, but responds to slower transients to turn off the clamp transistor MN1 to provide high immunity against leakage current in hot-plug or other slower transient situations.

Figure 4:
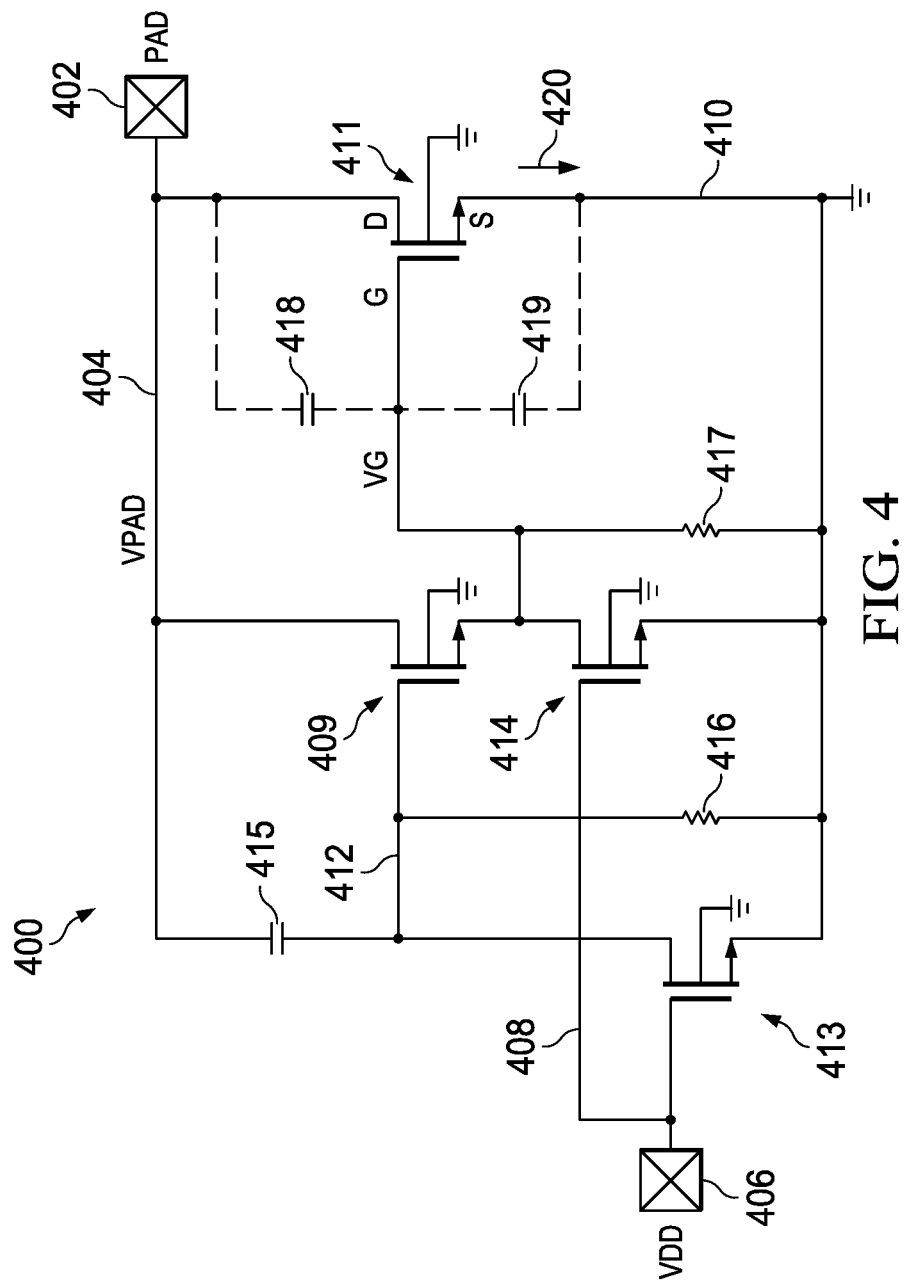
FIG. 4 is a schematic diagram of another ESD protection circuit.

Referring also to FIGS. 2-4, FIG. 4 shows another ESD protection circuit 400 without the leakage current mitigation provided by the second circuit 120 in FIG. 1. FIG. 2 shows a graph 200 of hot-plug event ESD circuit leakage current flow curves 201 and 202 comparing the leakage current characteristics of the protection circuits 400 and 100. FIG. 3 shows a graph 300 with curves 301 and 302 comparing the pad voltages VPAD during ESD events in the circuits 400 and 100.

The protection circuit 400 in FIG. 4 includes a clamp transistor 411 connected between a circuit node 404 coupled with a protected pad 402 and a ground node 410, having a gate-drain capacitance 418 and a gate-source capacitance 419. The circuit 400 also includes a supply voltage pad 406 (VDD) connected to a node 408 to provide a signal to gate terminals of transistors 413 and 414, and a further transistor 409 is connected between the protected pad node 404 and the drain of the transistor 414. The drain of the transistor 413 is connected to a gate control terminal of the transistor 409 at a node 412, and a capacitor 415 is connected between the protected pad node 404 and the node 412. A first resistor 416 is connected between the node 412 and the node 410, and a second resistor 417 is connected between the control gate of the clamp transistor 411 and the node 410.

The circuit 400 of FIG. 4 is subject to potentially excessive leakage currents during hot-plug and other transient conditions. In normal operation, with a positive voltage applied to the pad 406, the transistors 413 and 414 are turned on. In this condition, the voltage at the node 412 is low and the voltage of the gate of the clamp transistor 411 is low. This turns off the transistors 409 and 411, causing the capacitor 415 to charge to a voltage VPAD of the protected pad 402. For high voltage transient events, for example, during hot-plug situations in which the supply pad 406 is not connected to a voltage source, rising voltage on the protected pad 402 raises the gate voltage VG through the capacitor 418. This turns on the clamp transistor 411, causing current 420 to flow, shown as curve 201 in FIG. 2. In one example, this leakage current 201 (420 in FIG. 4) rises with a generally steep slope S1, and the leakage current has a rise time of approximately 1 μs, reaching a peak value 211 of approximately 1.6 A. This is in contrast with the performance shown in curve 202 for the protection circuit 100 of FIG. 1. In the circuit 100, the second circuit 120 pulls down the gate voltage VG of the clamp transistor MN1 in response to detection of a rise in the voltage at the node 114. This is shown in the curve 202 of FIG. 2, in which full turn on of the clamp transistor MN1 is prevented by the circuit 120, and the current $I_{MN1}$ rises at a slower rate shown by the slope S2, and the leakage current is limited to a much lower peak value 212, approximately 250 mA in the illustrated example. Accordingly, the circuit 120 advantageously mitigates leakage current during non-ESD transient conditions on the protected pad 102. In addition, as previously discussed, the second circuit 120 in FIG. 1 advantageously senses and responds to the slew rate voltage change of the clamp transistor gate terminal at node 114, and the circuit 120 can be implemented with low voltage components that are not connected to the protected pad line 104.

FIG. 3 illustrates pad voltage curves 301 and 302 during a 2000 V HBM ESD event. During ESD events in the protection circuit 400 of FIG. 4, a fast rise in the voltage VPAD raises the gate voltage at the node 412 due to the charged capacitor 415, which turns on the transistor 409 to raise the gate voltage VG of the clamp transistor 411 to direct ESD current flow 420 from the pad 402 to the node 410. The voltage clamping performance of the clamp transistor 411 is illustrated by a curve 301 in FIG. 3, showing the clamp pad voltage VPAD as a function of time following an ESD event. As seen in the curve 301, the pad voltage VPAD is clamped to a steady state level 311 of approximately 4.5 V in the example circuit 400 of FIG. 4. In the protection circuit 100 of FIG. 1, the voltage of the protected pad 102 is shown as curve 302 in FIG. 3 during an ESD event. In this example, the pad voltage VPAD reaches a somewhat higher steady state limit 312 than was the case for the circuit 400 of FIG. 4. The active clamping voltage steady state level 312 of the circuit 100 in this example is comparable to the steady state level 311 of the circuit 400.

The provision of the second circuit 120 in FIG. 1 advantageously allows the trigger circuit 116 and the clamping transistor MN1 to provide ESD protection for the circuit 104 connected to the protected pad 102, and further provides high immunity to non-ESD transient events such as hot-plug insertion situations, switching noise, or the like. The leakage current reduction advantages are achieved in certain implementations without introduction of any high voltage circuitry to the IC 101. In addition, the second circuit 120 reduces the transient event leakage current even for high voltage circuits in which the clamp transistor MN1 has a large gate-to-drain capacitance over gate-to-source capacitance ratio Cgd/Cgs (e.g., LDMOS or DEMOS clamp transistor). The circuitry 120 can thus be used to mitigate or avoid circuit damage or degradation using on-chip circuitry 120 within the IC 101, without the need for board-level current limiting circuits.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. An electrostatic discharge (ESD) protection circuit, comprising:
    a first transistor, including a first drain terminal coupled with a protected pad, a first source terminal coupled with a voltage supply node, and a first control terminal coupled to a first control node;
    a trigger circuit configured to turn on the first transistor to conduct a current from the protected pad to the voltage supply node in response to a first voltage rise in the protected pad at or above a first slew rate; and
    a second circuit coupled between the first control node and the voltage supply node, the second circuit configured to reduce the voltage of the first control node in response to a second voltage rise of the first control node at a second slew rate below the first slew rate, the reduced voltage of the first control node partially reducing the current flow through the first transistor, the second circuit comprising:
        a low pass filter circuit to provide a rising filter output signal at a first filter node responsive to the rises in the voltage of the first control node, the low pass filter circuit including a first filter resistor connected between the first control node and the first filter node, and a first filter capacitor connected between the first filter node and the voltage supply node, a filter time constant associated with the first filter resistor and the first filter capacitor of the low pass filter circuit is between 100 ns and 2 μs.

2. The ESD protection circuit of claim 1, wherein the second circuit includes:
    a second transistor, including a second drain terminal coupled with the first control node, a second source terminal coupled with the voltage supply node, and a second control terminal coupled with the first filter node to provide the rising filter output signal for turning on the second transistor.

3. The ESD protection circuit of claim 2, wherein the second circuit includes an RC circuit including a second resistor and a second capacitor to control a pull down strength of the second circuit, the second resistor connected between the first control node and the second drain terminal of the second transistor, and the second capacitor coupled between the first control node and the voltage supply node.

4. The ESD protection circuit of claim 2, wherein a filter time constant associated with the first filter resistor and the first filter capacitor of the low pass filter circuit corresponds to the second slew rate.

5. The ESD protection circuit of claim 2, wherein the trigger circuit includes a first capacitor and a first resistor to control a sensitivity of the trigger circuit, and wherein a trigger circuit time constant associated with the first capacitor and the first resistor corresponds to the first slew rate.

6. The ESD protection circuit of claim 2, wherein the trigger circuit includes a first capacitor and a first resistor to control a sensitivity of the trigger circuit, and wherein a trigger circuit time constant associated with the first capacitor and the first resistor is 100 ns or less.

7. The ESD protection circuit of claim 6, wherein the trigger circuit time constant associated with the first capacitor and the first resistor is 50 ns or less.

8. The ESD protection circuit of claim 2, wherein the trigger circuit includes:
   a first trigger circuit transistor connected between the protected pad and the first control node;
   a second trigger circuit transistor connected between the first control node and the voltage supply node;
   a first capacitor connected between the protected pad and a control terminal of the first trigger circuit transistor;
   a first resistor connected between the control terminal of the first trigger circuit transistor and the voltage supply node;
   a second resistor connected between the first control node and the voltage supply node; and
   a third trigger circuit transistor connected between the control terminal of the first trigger circuit transistor and the voltage supply node;
   wherein control terminals of the second and third trigger circuit transistors are connected to a second voltage supply node.

9. The ESD protection circuit of claim 8, wherein the trigger circuit includes a first capacitor and a first resistor to control a sensitivity of the trigger circuit, and wherein a trigger circuit time constant associated with the first capacitor and the first resistor corresponds to the first slew rate.

10. The ESD protection circuit of claim 8, wherein the trigger circuit includes a first capacitor and a first resistor to control a sensitivity of the trigger circuit, and wherein a trigger circuit time constant associated with the first capacitor and the first resistor is 100 ns or less.

11. The ESD protection circuit of claim 10, wherein the trigger circuit time constant associated with the first capacitor and the first resistor is 50 ns or less.

12. The ESD protection circuit of claim 1, wherein the trigger circuit includes:
   a first trigger circuit transistor connected between the protected pad and the first control node;
   a second trigger circuit transistor connected between the first control node and the voltage supply node;
   a first capacitor connected between the protected pad and a control terminal of the first trigger circuit transistor;
   a first resistor connected between the control terminal of the first trigger circuit transistor and the voltage supply node;
   a second resistor connected between the first control node and the voltage supply node; and
   a third trigger circuit transistor connected between the control terminal of the first trigger circuit transistor and the voltage supply node;
   wherein control terminals of the second and third trigger circuit transistors are connected to a second voltage supply node; and
   wherein a trigger circuit time constant associated with the first capacitor and the first resistor corresponds to the first slew rate.

13. An integrated circuit (IC), comprising:
   a conductive pad to electrically connect an internal circuit of the IC with an external circuit; and
   a protection circuit to protect the internal circuit connected to the conductive pad, the protection circuit including:
      a first transistor, including a first drain terminal coupled with the conductive pad, a first source terminal coupled with a voltage supply node, and a first control terminal coupled to a first control node,
      a trigger circuit to turn on the first transistor to conduct a current from the conductive pad to the voltage supply node in response to a first voltage rise in the conductive pad at or above a first slew rate, and
      a second circuit coupled between the first control node and the voltage supply node, the second circuit configured to reduce the voltage of the first control node in response to a second voltage rise in the first control node at a second slew rate below the first slew rate, the reduced voltage of the first control node partially reducing the current flow through the first transistor, the second circuit comprising:
         a low pass filter circuit to provide a rising filter output signal at a first filter node responsive to the rises in the voltage of the first control node, the low pass filter circuit including a first filter resistor connected between the first control node and the first filter node, and a first filter capacitor connected between the first filter node and the voltage supply node, a filter time constant associated with the first filter resistor and the first filter capacitor of the low pass filter circuit is between 100 ns and 2 µs.

14. The IC of claim 13, wherein the second circuit includes:
   a second transistor, including a second drain terminal coupled with the first control node, a second source terminal coupled with the voltage supply node, and a second control terminal coupled with the first filter node to provide the rising filter output signal for turning on the second transistor.

15. The IC of claim 14, wherein the second circuit includes an RC circuit including a second resistor and a second capacitor to control a pull down strength of the second circuit, the second resistor connected between the first control node and the second drain terminal of the second transistor, and the second capacitor coupled between the first control node and the voltage supply node.

16. The IC of claim 13, wherein the trigger circuit includes:
   a first trigger circuit transistor connected between the conductive pad and the first control node;
   a second trigger circuit transistor connected between the first control node and the voltage supply node;
   a first capacitor connected between the conductive pad and a control terminal of the first trigger circuit transistor;

a first resistor connected between the control terminal of the first trigger circuit transistor and the voltage supply node;

a second resistor connected between the first control node and the voltage supply node; and a third trigger circuit transistor connected between the control terminal of the first trigger circuit transistor and the voltage supply node;

wherein control terminals of the second and third trigger circuit transistors are connected to a second voltage supply node.

17. A circuit to mitigate leakage current in a clamp transistor of an ESD protection circuit during transient voltage conditions on a protected pad, comprising:

a low pass filter circuit to provide a rising filter output signal at a first filter node responsive to a voltage rise in a first control terminal of the clamp transistor, the low pass filter circuit including:

a filter resistor connected between the first control terminal and the first filter node, and a filter capacitor connected between the first filter node and a voltage supply node, a filter time constant associated with the filter resistor and the filter capacitor of the low pass filter circuit is between 100 ns and 2 µs; and a transistor, including a drain terminal coupled with the first control terminal, a source terminal coupled with the voltage supply node, and a second control terminal coupled with the first filter node to provide the rising filter output signal for turning on the transistor.

18. The circuit of claim 17, further comprising an RC circuit including a second resistor and a second capacitor to control a pull down strength of the circuit, the second resistor connected between the first control terminal and the drain terminal of the transistor, and the second capacitor coupled between the first control terminal and the voltage supply node.

* * * * *